United States Patent
Sakamoto et al.

(10) Patent No.: US 8,040,403 B2
(45) Date of Patent: Oct. 18, 2011

(54) IMAGE CAPTURING APPARATUS AND DARK CURRENT COMPONENT CANCEL PROCESSING METHOD

(75) Inventors: Shinya Sakamoto, Yokohama (JP); Yujin Arai, Tokyo (JP)

(73) Assignee: Olympus Corporation, Tokyo (JP)

( * ) Notice: Subject to any disclaimer, the term of this patent is extended or adjusted under 35 U.S.C. 154(b) by 501 days.

(21) Appl. No.: 12/077,562

(22) Filed: Mar. 20, 2008

(65) Prior Publication Data

US 2008/0231725 A1  Sep. 25, 2008

(30) Foreign Application Priority Data

Mar. 23, 2007 (JP) ................................. 2007-077016

(51) Int. Cl.
*H04N 9/64* (2006.01)
*H04N 5/235* (2006.01)
*H04N 5/228* (2006.01)

(52) U.S. Cl. ...................... 348/243; 348/362; 348/222.1

(58) Field of Classification Search ............... 348/299.1, 348/367, 362–363, 222.1, 241–244, 248, 348/366, 364
See application file for complete search history.

(56) References Cited

U.S. PATENT DOCUMENTS

| | | | |
|---|---|---|---|
| 6,747,696 B1 * | 6/2004 | Nakata et al. ................. | 348/243 |
| 2002/0105586 A1 * | 8/2002 | Harada ........................ | 348/312 |
| 2003/0174894 A1 * | 9/2003 | Matherson et al. ........... | 382/233 |
| 2004/0051797 A1 * | 3/2004 | Kelly et al. ................... | 348/244 |
| 2005/0018253 A1 * | 1/2005 | Takeda ........................ | 358/474 |

FOREIGN PATENT DOCUMENTS

| | | |
|---|---|---|
| JP | 2002-135661 A | 5/2002 |
| JP | 2005-159447 A | 6/2005 |

* cited by examiner

*Primary Examiner* — Nhan T Tran
*Assistant Examiner* — Tuan Le
(74) *Attorney, Agent, or Firm* — Holtz, Holtz, Goodman & Chick, P.C.

(57) ABSTRACT

An image capturing apparatus having a shutter for making an image capturing element enter a light-shielded state or a light-unshielded state comprises an image capturing condition storing unit for storing a plurality of image capturing conditions, a dark-time image data storing unit for storing a plurality of pieces of dark-time image data captured with the image capturing element under the image capturing conditions in the light-shielded state, a bright-time image data storing unit for storing bright-time image data captured with the image capturing element in the light-unshielded state, a dark-time image data extracting unit for extracting a dark-time image captured under an image capturing condition corresponding to an image capturing condition under which the bright-time image is captured, and a correcting unit for correcting the bright-time image data based on the dark-time image data extracted by the dark-time image data extracting unit.

7 Claims, 10 Drawing Sheets

EXPOSURE TIME

| | 2s | 10s | 30s | 60s | 120s |
|---|---|---|---|---|---|
| ISO200 | 1 | 2 | 3 | 4 | 5 |
| ISO400 | 6 | 7 | 8 | 9 | 10 |
| ISO800 | 11 | 12 | 13 | 14 | 15 |

IMAGE CAPTURING SENSITIVITY

F I G. 2

| EXPOSURE TIME (s) | DARK DATA TO BE EXTRACTED |
|---|---|
| -0.1 | NO SUBTRACTION |
| 0.1-6 | 2s |
| 6-20 | 10s |
| 20-45 | 30s |
| 45-90 | 60s |
| 90- | 120s |

FIG. 5

| EXPOSURE TIME (s) | ISO200 | ISO400 | ISO800 |
|---|---|---|---|
| −0.1 | NO SUBTRACTION | NO SUBTRACTION | 2s |
| 0.1−6 | NO SUBTRACTION | 2s | 2s |
| 6−20 | 10s | 10s | 10s |
| 20−45 | 30s | 30s | 30s |
| 45−90 | 60s | 60s | 60s |
| 90− | 120s | 120s | 120s |

F I G. 7

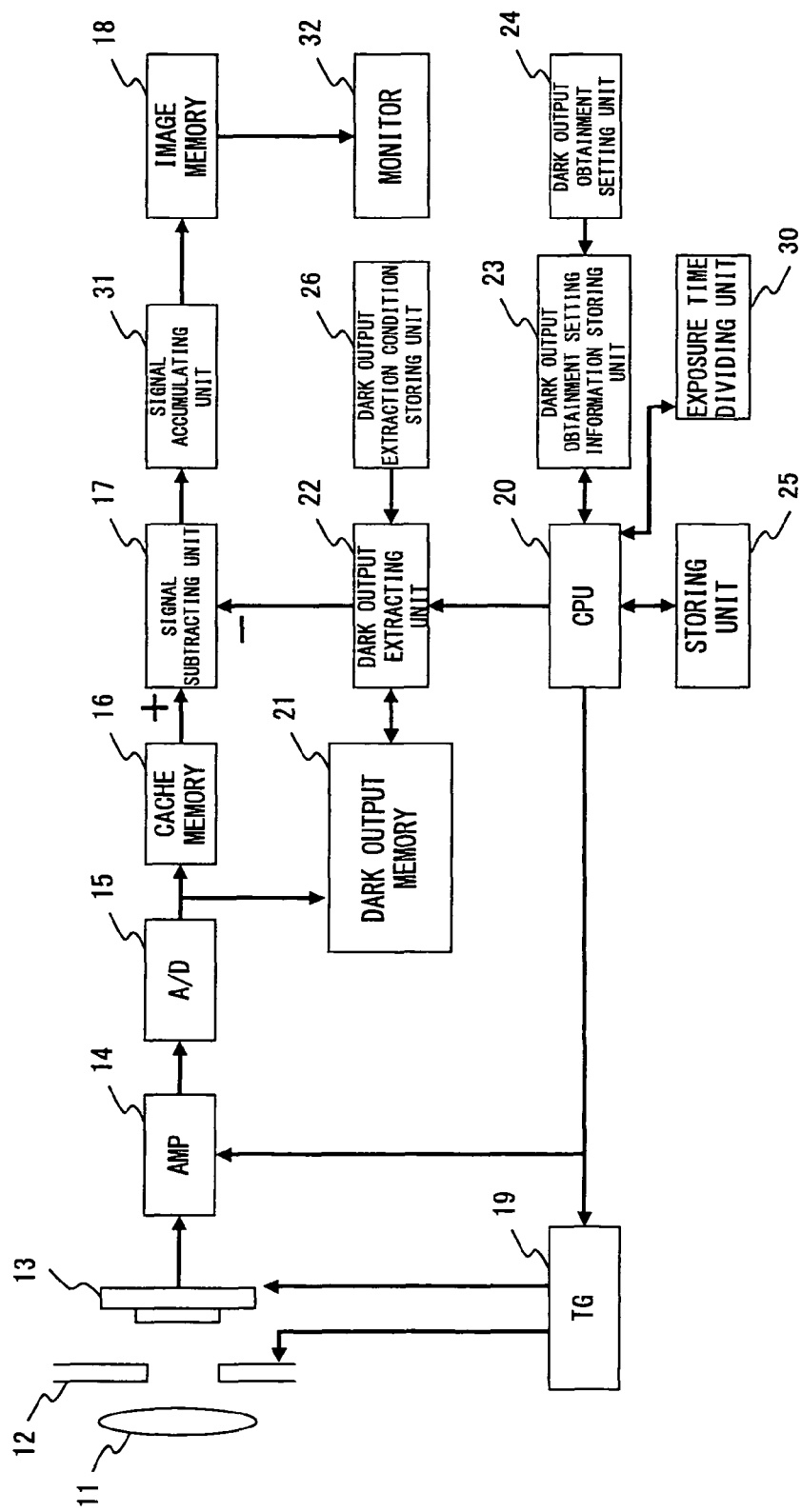
F I G. 8

IMAGE CAPTURING APPARATUS AND DARK CURRENT COMPONENT CANCEL PROCESSING METHOD

CROSS REFERENCE TO RELATED APPLICATION

This application is based on and claims the benefit of priority from the prior Japanese Patent Application No. 2007-77016 filed in Japan on Mar. 23, 2007, the entire contents of which are incorporated by this reference.

BACKGROUND OF THE INVENTION

1. Field of the Invention

The present invention relates to a dark current component removing technology for observation image data.

2. Description of the Related Art

In recent years, electronic still cameras have been developed to mainly capture and record still images. An image capturing element used for a camera of this type has fixed pattern noise (dark noise) caused by variations in the crystal quality and the output characteristic of a material in each pixel. Therefore, if an output signal of an image capturing element is used unchanged, its dark noise is superimposed on an effective signal component, leading to degradation in the quality of a captured image.

To remove such dark noise, an electronic still camera having a noise reduction function exists. With this noise reduction function, an image capturing element is exposed with a shutter closed, and a resultant dark output is recorded in a memory when an image is captured.

Then, the image capturing element is exposed with the shutter opened, and the dark output stored in the memory is subtracted from a bright-time image signal obtained with this exposure.

With this method, dark noise that occurs with the same sensitivity and for the same exposure time is almost constant. Therefore, dark noise that occurs at the time of a dark output is canceled by a difference, whereby dark noise can be suppressed with high efficiency.

Dark noise increases with an electric charge storage time or sensitivity. Accordingly, the effect of further improving the quality of an image can be produced with this method at the time of long exposure and highly sensitive exposure. Accordingly, a noise reduction process is a function beneficial to a user of an electronic still camera.

However, since the noise reduction process requires a dark output obtainment time, continuous image capturing is hindered by a dark output obtainment process time in a method for obtaining a dark output immediately after image capturing. Additionally, a method for obtaining a dark output immediately before image capturing has disadvantages such as a shutter time lag caused by a dark output obtainment process, leading to the missing of a photo opportunity.

Accordingly, Japanese Published Unexamined Patent Application No. 2002-135661 discloses the technique for obtaining dark output data, which is longer by several stages than an exposure time determined at the time of metering, immediately before image capturing, and for using the data for a subsequent process. With this technique, a subsequent shutter time lag can be prevented from occurring, and continuous image capturing can be made by using dark output data after the data is obtained.

Additionally, Japanese Published Unexamined Patent Application No. 2005-159447 discloses the image capturing apparatus that controls a signal read from an image capturing element according to a relationship between the exposure time of the image capturing element and the time interval of image capturing, and can obtain a signal, the dark noise of which is suppressed, by executing a process for subtracting a dark-time signal, which is output from the image capturing element in a light-shielded state, from a bright-time signal that is output from the image capturing element in a light-unshielded state. With this apparatus, a high-quality image the dark noise of which is suppressed can be obtained while satisfying an image capturing interval at the time of interval shooting repeatedly made at predetermined time intervals.

SUMMARY OF THE INVENTION

An image capturing apparatus having a shutter for making an image capturing element enter a light-shielded state or a light-unshielded state according to the present invention comprises an image capturing condition storing unit for storing a plurality of image capturing conditions, a dark-time image data storing unit for storing a plurality of pieces of dark-time image data captured with the image capturing element under the image capturing conditions, a bright-time image data storing unit for storing bright-time image data captured with the image capturing element in the light-unshielded state, a dark-time image data extracting unit for extracting from the dark-time image data storing unit a dark-time image captured under an image capturing condition corresponding to an image capturing condition under which the bright-time image is captured, and a correcting unit for correcting the bright-time image data based on the dark-time image data extracted by the dark-time image data extracting unit.

A dark current component cancel processing method for removing a dark current component from image data captured with an image capturing element according to the present invention comprises prestoring dark time image data, which is captured with the image capturing element, for each predetermined image capturing condition, obtaining bright-time image data by capturing an observation target image with the image capturing element, selecting dark-time image data obtained under an image capturing condition, which corresponds to an image capturing condition when the bright-time image data is obtained, from among the prestored dark-time image data, and subtracting the selected dark-time image data from the bright-time image data.

BRIEF DESCRIPTION OF THE DRAWINGS

FIG. 2 shows one example of dark output obtainment setting information in the first preferred embodiment (implementation example 1);

FIG. 5 shows one example of a dark output extraction condition table for determining dark output data that is selected according to an exposure time in the first preferred embodiment (implementation example 1);

FIG. 7 shows one example of a dark output extraction condition table for determining dark output data that is selected according to an exposure time and image capturing sensitivity in the first preferred embodiment (implementation example 3);

FIG. 8 shows a configuration of an image capturing apparatus in a second preferred embodiment;

DESCRIPTION OF THE PREFERRED EMBODIMENTS

Figure 1:
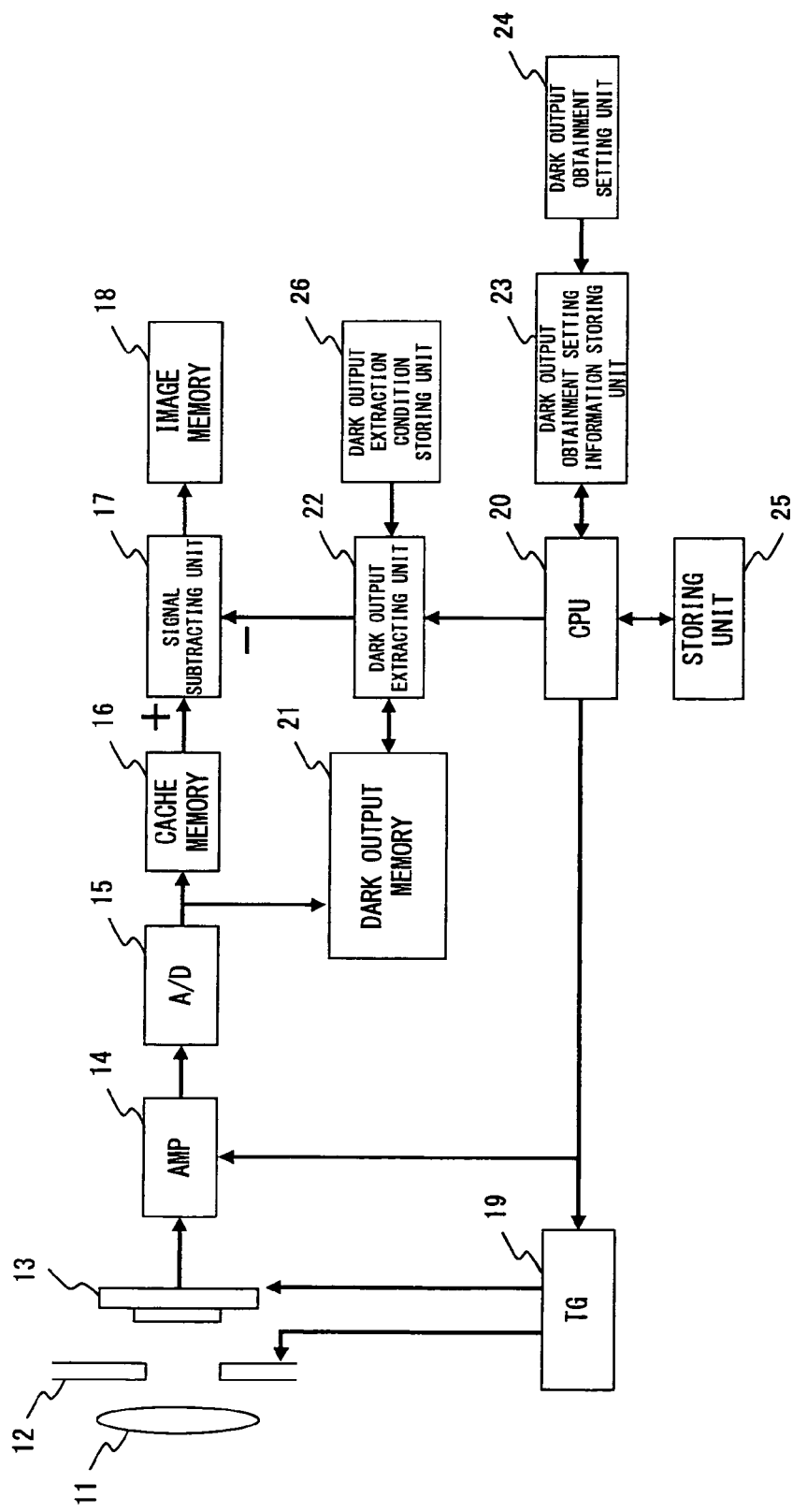
FIG. 1 shows the concept of a configuration of an image capturing apparatus in a first preferred embodiment (implementation example 1)

An image capturing apparatus having a shutter for entering an image capturing element enter a light-shielded state or a light-unshielded state according to the present invention comprises an image capturing condition storing unit, a dark-time image data storing unit, a bright-time image data storing unit, a dark-time image data extracting unit, and a correcting unit.

The image capturing condition storing unit stores a plurality of image capturing conditions. The image capturing condition storing unit corresponds to a dark output obtainment setting information storing unit 23 in preferred embodiments according to the present invention.

The dark-time image data storing unit stores a plurality of pieces of dark-time image data captured with the image capturing element under the image capturing conditions in the light-shielded state. The dark-time image data storing unit corresponds to a dark output memory 21 in the preferred embodiments according to the present invention.

The bright-time image data storing unit stores bright-time image data captured with the image capturing element in the light-unshielded state. The bright-time image data storing unit corresponds to a cache memory 16 in the preferred embodiments according to the present invention.

The dark-time image data extracting unit extracts a dark-time image, which is captured under an image capturing condition corresponding to an image capturing condition under which the bright-time image is captured, from the dark-time image data storing unit. The dark-time image data extracting unit corresponds to a dark output extracting unit 22 in the preferred embodiments according to the present invention, and may further include a dark output extraction condition storing unit 26.

The correcting unit corrects the bright-time image data based on the dark-time image data extracted by the dark-time image data extracting unit. The correcting unit corresponds to a signal subtracting unit 17 in the preferred embodiments according to the present invention.

With this configuration, an image the dark noise of which is suppressed can be quickly obtained without hindering continuous image capturing or causing a shutter time lag under any image capturing conditions.

The image capturing conditions include at least either of image capturing sensitivity and an exposure time. With this configuration, an image capturing condition based on a combination of image capturing sensitivity and an exposure time can be set.

The image capturing conditions may further include an ambient temperature at the time of image capturing. With such a configuration, a more precise noise reduction process can be executed.

The image capturing apparatus may further comprise a dark-time image data generating unit. The dark-time image data generating unit generates an image capturing condition, which is not included in image capturing conditions stored in the image capturing condition storing unit, and dark-time image data, which corresponds to the image capturing condition, from dark-time image data stored in the dark-time image data storing unit. The dark-time image data generating unit corresponds to a CPU 20 in the preferred embodiments according to the present invention.

With such a configuration, a dark-time image under a further detailed image capturing condition can be obtained with an interpolation process from dark-time images captured under preset dark-time image capturing conditions. As a result, noise can be suppressed more suitably.

The plurality of pieces of dark-time image data stored in the dark-time image data storing unit may be differential image data among the pieces of dark-time image data. With such a configuration, a memory area used to store images can be reduced.

The image capturing apparatus may further comprise an exposure time dividing unit, an accumulating unit, and a displaying unit. The exposure time dividing unit divides an exposure time for the image capturing element. The exposure time dividing unit corresponds to an exposure time dividing unit 30 in the preferred embodiment according to the present invention.

The accumulating unit accumulates image data that is captured with the image capturing element and corrected by the correcting unit for each divided exposure time. The accumulating unit corresponds to a signal accumulating unit 31 in the preferred embodiment according to the present invention.

On the displaying unit, accumulated image data is displayed every time the image data is accumulated by the accumulating unit. The displaying unit corresponds to a monitor 32 in the preferred embodiment according to the present invention.

With such a configuration, the progression of an image capturing process can be verified on the screen at the time of long image capturing.

The preferred embodiments according to the present invention are described in detail below.

First Preferred Embodiment

This preferred embodiment refers to an image capturing apparatus for obtaining a bright-time image the dark noise of which is removed by obtaining a dark-time image under a preset image capturing condition, and by subtracting the dark-time image from the bright image obtained under the image capturing condition.

Implementation Example 1

With a conventional technique, influences of hindered continuous image capturing, a shutter time lag, etc. are exerted on an initial image capturing process when an image the dark noise of which is suppressed is obtained. Additionally, dark output data must be again obtained if image capturing sensitivity is changed or an exposure time is significantly prolonged even after initial dark output data is obtained.

Accordingly, this implementation example refers to an image capturing apparatus that can quickly obtain an image, the dark noise of which is suppressed, under any image capturing conditions. Namely, executed in this implementation example is a process for prestoring at least dark-time image capturing data at predetermined exposure time intervals, and for canceling a dark current component of captured observation image data by using the prestored dark-time image capturing data.

FIG. 1 shows the concept of a configuration of the image capturing apparatus according to this preferred embodiment.

The image capturing apparatus is composed of an optical system 11, a shutter 12, an image capturing element 13, an amplifier (AMP) 14, an A/D converter 15, a cache memory 16, a signal subtracting unit 17, an image memory 18, a timing generator (TG) 19, a CPU (Central Processing Unit) 20, a dark output memory 21, a dark output extracting unit 22, a dark output extraction condition storing unit 26, a dark output obtainment setting information storing unit 23, a dark output obtainment setting unit 24, and a storing unit 25.

The optical system 11 is composed of various types of lenses. The shutter 12 selectively shields light from a subject. The image capturing element 13 is an element for converting received light into an electronic signal. On its light-receptive surface, a subject image is formed via the optical system 11 and the shutter 12.

The amplifier 14 amplifies a signal, which is output from the image capturing element 13, according to image capturing sensitivity. The A/D converter 15 converts an analog signal into a digital signal. The cache memory 16 stores a captured image signal.

The dark output memory 21 can stores a plurality of pieces of dark output data obtained respectively for exposure times/sensitivities. The dark output extraction condition storing unit 26 stores an extraction condition under which the dark output extracting unit 22 extracts a suitable dark output from the dark output memory 21. The dark output extracting unit 22 obtains a dark output extraction condition, which corresponds to an image capturing setting condition of a camera, from the dark output extraction condition storing unit 26, and extracts an image signal stored in the cache memory 16 under the obtained dark output extraction condition.

The dark output obtainment setting unit 24 is an inputting unit for making image capturing settings (an exposure time and image capturing sensitivity), and setting an image capturing order of a dark output data group stored in the dark output memory 21. The dark output obtainment setting information storing unit 23 stores dark output obtainment setting information (an exposure time, image capturing sensitivity, and an image capturing order) set by the dark output obtainment setting unit 24.

The signal subtracting unit 17 subtracts dark output data, which is obtained by the dark output extracting unit 22, from an image signal stored in the cache memory 16. An image signal output from the signal subtracting unit 17 is stored in the image memory 18.

The timing generator 19 controls the driving timings of the shutter 12 and the image capturing element 13. The timing generator 19 performs such controls, whereby an exposure time and light-shielding/light-unshielding can be controlled.

The storing unit 25 is a memory such as a ROM (Read Only Memory) that stores a program for controlling the system, a RAM (Random Access Memory) that stores data required for a control and is a volatile memory. The CPU 301 performs a centralized control over the constituent elements within the image capturing apparatus by reading the program preset in the ROM.

FIG. 2 shows one example of dark output obtainment setting information in this preferred embodiment. As shown in this figure, an image capturing order, which is set by the dark output obtainment setting unit 24 according to image capturing sensitivity and an exposure time, is stored as dark output obtainment setting information in the dark output obtainment setting information storing unit 23.

With this table, the image capturing settings (an exposure time and image capturing sensitivity) and the image capturing order (1 to 15 in FIG. 2) of a dark output data group stored in the dark output memory 21 can be determined.

Figure 3:
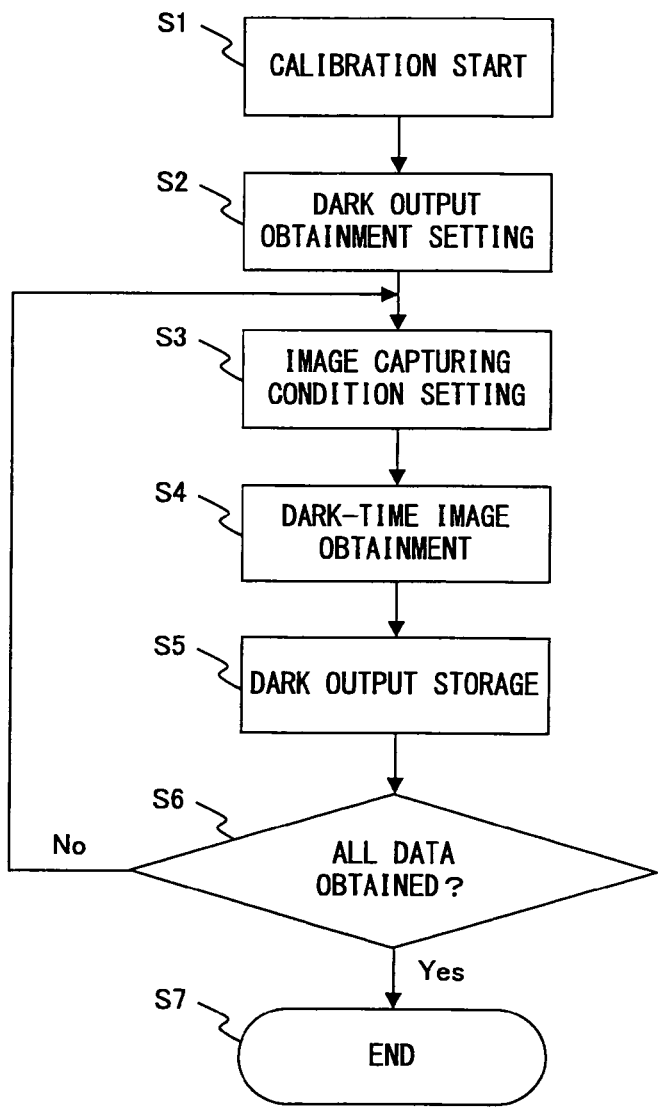
FIG. 3 shows the flow of dark output data obtainment operations in the first preferred embodiment (implementation example 1)

FIG. 3 shows the flow of dark output data obtainment operations performed in this preferred embodiment. This series of operations is camera calibration made when a camera is shipped from a factory or before a user uses the camera. The CPU 20 performs a centralized control over the whole of this flow.

Initially, when a user issues an instruction to start camera calibration, its instruction signal is transmitted to the CPU 20 (step 1. step is hereinafter abbreviated to 'S'). Upon receipt of the calibration instruction signal, the CPU 20 reads from the dark output obtainment setting information storing unit 23 image capturing conditions (exposure times and image capturing sensitivities) for obtaining a dark output data group, and image capturing order information corresponding to the image capturing conditions (S2).

Next, the CPU 20 sets the exposure times and the image capturing sensitivities in the order read in S2 (S3). For example, an image capturing condition of a number "1" in FIG. 2 is "an exposure time of 2 s and image capturing sensitivity of ISO200". Therefore, this condition is set.

Thereafter, the CPU 20 obtains dark output data under the image capturing condition set in S3 in a state where the shutter 12 is closed (S4). In this example, the dark output data of the exposure time of 2 s and the image capturing sensitivity of ISO200" is obtained. The CPU 20 stores the obtained dark output data (dark-time image) in the dark output memory 21 (S5).

The CPU 20 repeats the processes of S3 to S5 until obtaining the dark output data of all the image capturing conditions read in S2 (S6). In the case of FIG. 2, this loop process is executed until the dark output data of "the exposure time of 2 s and the image capturing sensitivity of ISO200" (first), "an exposure time of 10 s and image capturing sensitivity of ISO200" (second), . . . and "an exposure time of 120 s and image capturing sensitivity of ISO800 (fifteenth) are obtained respectively.

When the dark output data of all the image capturing conditions set in the dark output obtainment setting information storing unit 23 are obtained (the flow proceeds to "YES" in S6), the CPU 20 terminates the camera calibration (S7).

Figure 4:
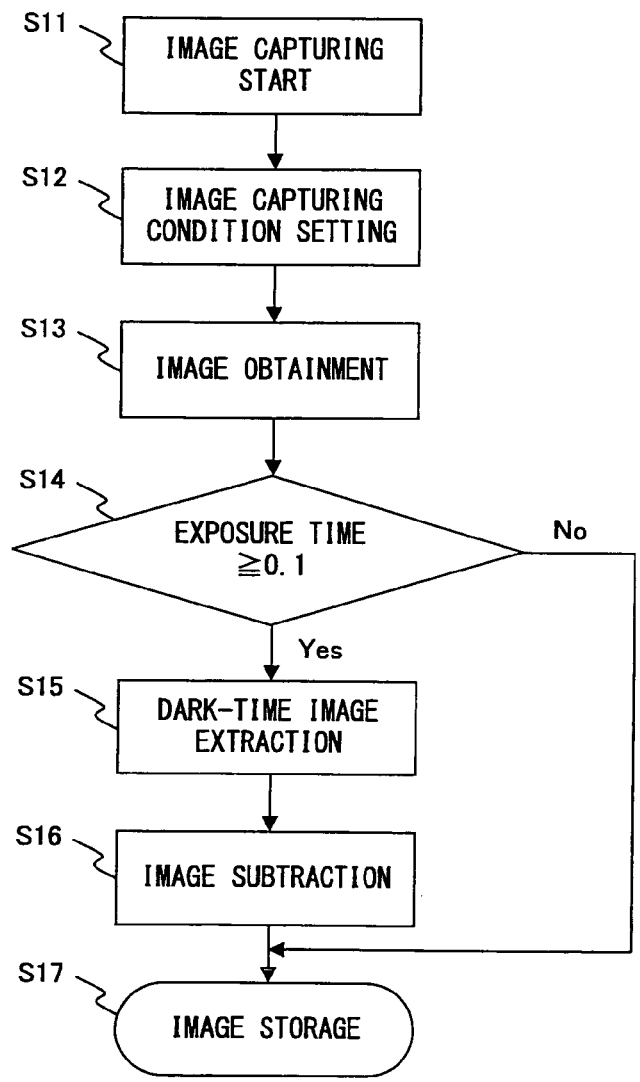
FIG. 4 shows the flow of a noise reduction process in the first preferred embodiment (implementation example 1)

FIG. 4 shows the flow of a noise reduction process executed in this preferred embodiment. Once a user issues an instruction to start image capturing, its image capturing start instruction signal is transmitted to the CPU 20 (S11).

Upon receipt of the image capturing start instruction signal, the CPU 20 sets sensitivity and an exposure time according to an image capturing condition specified by the user (S12), and captures an image. The CPU 20 stores the captured image in the cache memory 16 (S13).

At this time, the CPU 20 determines the exposure time (S14). If the exposure time is shorter than 0.1 [s] (the flow proceeds to "NO" in S14), the CPU 20 determines that dark noise is sufficiently low, and stores the image in the image memory 18 unchanged without executing the noise reduction process (S17).

If the exposure time is equal to or longer than 0.1 [s] (the flow proceeds to "YES" in S14), the CPU 20 controls the dark output extracting unit 22, which then extracts dark output data from the dark output memory 21 according to a table of FIG. 5 (S15). Here, FIG. 5 is described.

FIG. 5 shows one example of a dark output extraction condition table for determining dark output data selected according to an exposure time in this preferred embodiment. The dark output extraction condition table is stored in the dark output extraction condition storing unit 26.

For example, if the exposure time set in S12 ranges from 0.1 to 0.6 [s], the dark output extracting unit 22 extracts from the dark output memory 21 dark output data (dark-time image) which is captured with the same image capturing sensitivity as that set in S12 and the exposure time of which is 2 [s] based on the dark output extraction condition table. Turning back to the flow of FIG. 4.

Subsequently, the CPU 20 controls the signal subtracting unit 17, which then subtracts the dark output data extracted in S15 from the signal data stored in the cache memory 16 (S16). Thereafter, the CPU 20 stores in the image memory 18 the data (image signal the dark noise of which is suppressed) resulting from the subtraction process executed by the signal subtracting unit 17 (S17).

In this way, the noise reduction process can be suitably executed without requiring a long dark noise suppression process time before and after a subject image is captured under any image capturing conditions. Accordingly, an image the dark noise of which is suppressed can be quickly obtained under any image capturing conditions.

Implementation Example 2

The implementation example 1 provides the explanation by using dark output data in the proximity of an exposure time at the time of noise reduction. Also available is a technique for calculating and deriving dark output data, which corresponds to an exposure time, from obtained dark output data. An example of the technique in this case is described with reference to FIG. 6.

Figure 6:
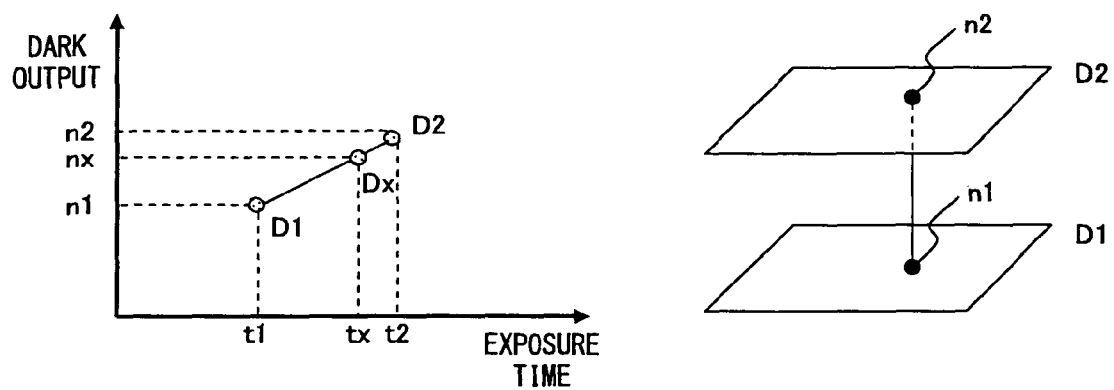
FIG. 6 explains the first preferred embodiment (implementation example 2)

FIG. 6 explains this preferred embodiment (implementation example 2). This figure refers to the example of extracting a dark output value nx of a particular pixel x of dark output data Dx obtained with an exposure time tx.

Assume that the values of the pixel x of two pieces of dark output data D1 and D2 (see FIG. 6A), which are obtained for exposure times t1 and t2 (t1<tx<t2) and with the same image capturing sensitivity, are n1 and n2 respectively (see FIG. 6B). In this case, the dark output value nx is represented as follows with linear interpolation.

$$nx = \frac{tx - t1}{t2 - t1}n2 + \frac{t2 - tx}{t2 - t1}n1$$

This interpolation process is executed for all of pixels, whereby the dark output data Dx can be constructed. With this process, the dark output data Dx of an arbitrary exposure time tx can be obtained. Accordingly, the noise reduction process can be executed based on the dark output data Dx according to the exposure time tx for which an image is actually captured, even if the image is captured for an exposure time other than the exposure times set in FIG. 2. As a result, dark output data can be removed with higher precision.

Implementation Example 3

In the above described implementation examples, the dark output extracting unit 22 extracts dark output data, which is the base of a subtraction, based on an exposure time. Also image capturing sensitivity may be added as an extraction parameter.

FIG. 7 shows one example of a dark output extraction condition table for determining dark output data that is selected according to an exposure time and image capturing sensitivity in this preferred embodiment (implementation example 3). Dark output data may be determined based on an exposure time and image capturing sensitivity as shown in this figure.

In FIG. 7, by way of example, for an exposure time of 0.1 s or shorter, the reduction process of this preferred embodiment is set to be executed only for ISO800, and set not to be executed for ISO200 and ISO400. This is because dark noise becomes more noticeable as image capturing sensitivity increases.

Implementation Example 4

Also the temperature of the image capturing element may be added in addition to an exposure time and image capturing sensitivity as parameters of an image capturing condition. Namely, in the calibration process of FIG. 3, the cooling temperature of the image capturing element may be one of parameters of an image capturing condition, and dark output data obtained at the cooling temperature may be stored.

In this case, the image capturing apparatus comprises a temperature detection sensor for detecting the temperature of the image capturing element. The CPU 20 detects, with the temperature detection sensor, the temperature of the image capturing element 13 at a time point when the image capturing element 13 has captured an observation target image, and extracts dark output data, which is obtained at a temperature closest to the cooling temperature of the image capturing element, from among dark output data stored in the dark output memory 21. A temperature to be used as a parameter is not limited to the cooling temperature of the image capturing element. For example, an ambient temperature of the image capturing element may be used. As a result, a more precise dark noise reduction process can be executed.

Implementation Example 5

Additionally, as the plurality of pieces of dark output data stored in the dark output memory 21, differences among images may be stored. Or, the dark output data may be stored by compressing images. This produces the effect of saving a memory space by reducing stored data.

This preferred embodiment assumes that the contents of the dark output obtainment setting information storing unit 23 are preset. However, a user may set the contents. Or, a plurality of pieces of dark output data under the same condition may be obtained and averaged at the time of calibration. This produces the effect of improving image quality by reducing random noise.

Second Preferred Embodiment

This preferred embodiment refers to an image capturing apparatus that divides a long exposure time at predetermined time intervals, and displays an image, the noise of which is suppressed, in stages without waiting for the termination of exposure in a case of long exposure by subtracting a dark-time image, which is obtained under a preset image capturing condition, from a bright-time image as referred to in the first preferred embodiment for each divided exposure time. Explanations about portions similar to those in the first preferred embodiment are omitted here.

FIG. 8 shows a configuration of the image capturing apparatus according to this preferred embodiment. The configuration of FIG. 8 is implemented by adding an exposure time dividing unit 30, a signal accumulating unit 31, and a monitor 32 to the configuration of the image capturing apparatus shown in FIG. 1.

The exposure time dividing unit 30 divides and sets an exposure time if the exposure time is equal to or longer than a particular exposure time. The signal accumulating unit 31 sequentially adds data transmitted from the signal subtracting unit 17, and stores the added data in the image memory 18 as needed. The monitor 32 displays the image data stored in the image memory 18.

Figure 9:
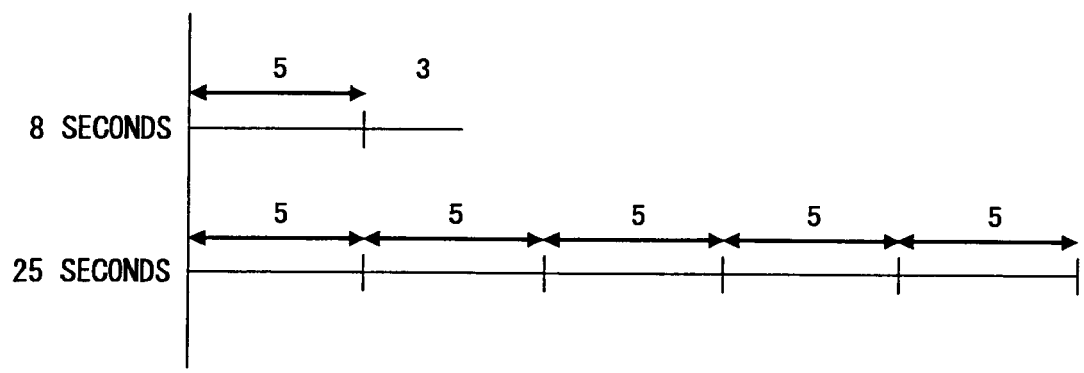
FIG. 9 explains an exposure time dividing method in the second preferred embodiment.

FIG. 9 explains an exposure time dividing method according to this preferred embodiment. This figure shows an example where the exposure time dividing unit 30 divides an exposure time at intervals of 5 seconds. For example, if the exposure time is 8 seconds, it is divided into 5 seconds and remaining 3 seconds. Or, if the exposure time is 25 seconds, it is divided at intervals of 5 seconds.

The advantage of dividing an exposure time and executing the noise reduction process for each divided exposure time as described above is as follows. For example, if the exposure time is 30 seconds, the noise reduction process according to the first preferred embodiment is executed after the exposure time of 30 seconds elapses. Therefore, no image is displayed until that length of exposure time elapses. Accordingly, the exposure time is divided, the noise reduction process according to the first preferred embodiment is executed for each divided exposure time, the monitor 32 is caused to display a resultant image, and image data after the noise reduction process is added as needed, whereby an image is clearly displayed on the monitor 32 by degrees. Additionally, there is no need to add dark output data for long exposure, and existing settings in the image capturing order setting table of FIG. 2 can be effectively utilized, thereby eliminating the need for expanding the storage area of the image capturing order setting table.

Figure 10:
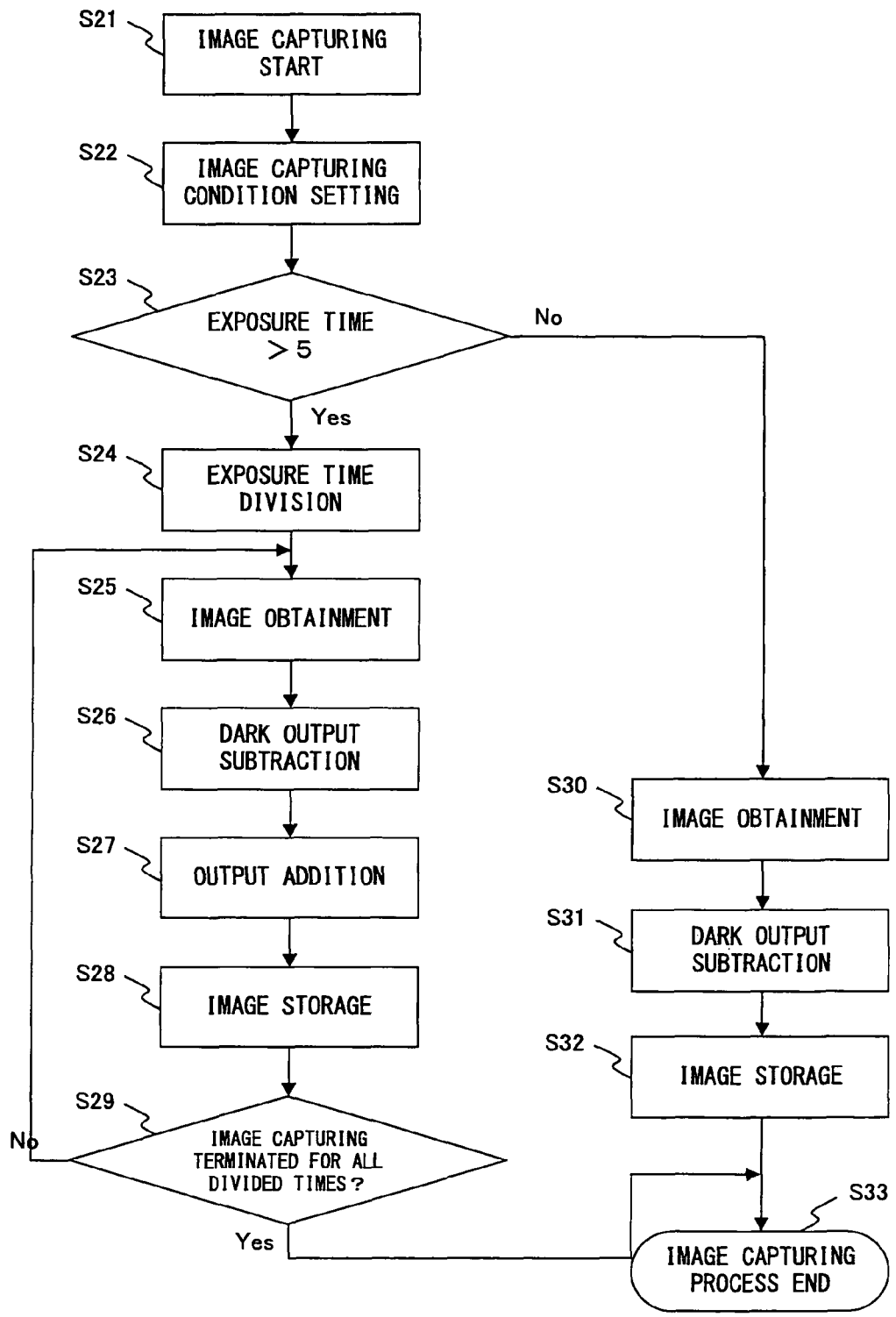
FIG. 10 shows the flow of a noise reduction process in the second preferred embodiment.

FIG. 10 shows the flow of the noise reduction process executed in this preferred embodiment. Here, assume that the calibration process of FIG. 3 is executed beforehand.

When a user initially issues an instruction to start image capturing, its image capturing start instruction signal is transmitted to the CPU 20 (S21). Upon receipt of the image capturing start instruction signal, the CPU 20 sets an exposure time and image capturing sensitivity under an image capturing condition specified by the user (S22). Here, the CPU 20 determines the length of the exposure time (S23).

If the length of the exposure time is equal to or shorter than 5 s in S23 (the flow proceeds to "NO" in S23), an image is obtained (S30), a dark output is subtracted (S31), and the image is stored (S32) with processes similar to normal ones. S30 to S32 correspond to the processes of S13 to S17 of FIG. 4 in the first preferred embodiment. The image capturing process is terminated at this point (S33).

If the exposure time is equal to or longer than 5 s in S23 (the flow proceeds to "YES" in S23), the CPU 20 controls the exposure time dividing unit 30. Then, the exposure time dividing unit 30 divides the exposure time at intervals of 5 s, and outputs a camera control signal to the CPU 20 (S24).

Next, an image is obtained for the divided exposure time (S25), and dark output data is subtracted by the signal subtracting unit 17 (S26. Similar to the processes of S15 and S16 shown in FIG. 4) under the control of the CPU 20. The obtained image signal the dark noise of which is suppressed is added by the signal accumulating unit 31 (S27). The signal accumulating unit 31 accumulates an image signal the dark noise of which is suppressed and which is repeatedly obtained for each divided exposure time. The added signal obtained in S27 is stored in the image memory 18 (S28), and displayed on the monitor 32 as needed.

Thereafter, it is determined whether or not all images have been obtained for the exposure times divided by the exposure time dividing unit 30 (S29). If all the images have not been obtained yet in S29 (the flow proceeds to "NO" in S29), an image is obtained for the next divided exposure time (S25). Hereafter, processes similar to the above described ones are executed, and an obtained added signal is updated as needed.

For example, if the exposure time is 8 seconds, it is divided into 5 seconds and 3 seconds by the exposure time dividing unit 30. Therefore, the loop process of S25 to S29 is executed twice. At this time, an image is captured for the exposure time of 5 seconds, and stored in the cache memory 16 in the first loop process (S25). Then, the dark output extracting unit 22 extracts the dark output data of the exposure time of 5 seconds from the dark output memory 21. The signal subtracting unit 17 subtracts the dark output data, which is extracted from the dark output memory 21, from the captured image signal data stored in the cache memory 16 (S26). The image signal the dark noise of which is suppressed and which is output from the signal subtracting unit 17 is input to the signal accumulating unit 31. Because this is the first loop process, the signal accumulating unit 21 outputs the image signal, the dark noise of which is suppressed, to the image memory 18 unchanged, and the monitor 32 displays the image.

In the second loop process, an image is captured for the exposure time of 3 seconds, and stored in the cache memory 16 (S25). Then, the dark output extracting unit 22 extracts the dark output data of the exposure time of 3 seconds from the dark output memory 21. The signal subtracting unit 17 subtracts the dark output data, which is extracted from the dark output memory 21, from the captured image signal data stored in the cache memory 16 (S26). The image signal the dark noise of which is suppressed and which is output from the signal subtracting unit 17 is input to the signal accumulating unit 31. Since this is the second process or later, the signal accumulating unit 31 adds the image signal, the dark noise of which is suppressed and which is obtained this time, to the image signal the dark noise of which is suppressed and which is obtained until the preceding time, and outputs the resultant signal to the image memory 18. Then, the monitor 32 displays the image.

If it is determined that the process has been executed for all the divided exposure times in S29 (the flow proceeds to "YES" in S29), the image capturing process is terminated (S33).

By adopting this preferred embodiment, an image the dark noise of which is suppressed in the progression of suppressing dark noise during a long exposure time can be displayed while suppressing the dark noise at the time of long exposure.

The above explanation is provided by adopting the method for displaying an added signal as a display made in the progression of exposure. However, a method for displaying an image of an added signal the gain of which is corrected may be adopted. Namely, if an image is captured up to an exposure time Tb with respect to an entire exposure time Ta, an image with a digital gain can be obtained and displayed by multiplying the value of an image signal by Ta/Tb.

Additionally, a divided time duration may be determined depending on an exposure time. For example, a process for dividing an exposure time at longer time intervals in the case of longer exposure, or for dividing an exposure time at short time intervals in the case of somewhat short exposure may be executed.

Furthermore, the dark output obtainment setting information storing unit 23 is made to store dark output obtainment setting information, and the dark output extraction condition storing unit 26 is made to store a dark output extraction condition in the above described preferred embodiments. However, the storing unit 25 may be made to store the dark output obtainment setting information and the dark output extraction condition.

Various modifications can be made to all the preferred embodiments referred to in the present invention as far as they do not depart from the spirit and scope of the present invention.

According to the present invention, an image the dark noise of which is suppressed can be quickly obtained without hindering continuous image capturing and causing a shutter time lag under any image capturing conditions. Accordingly, an image the noise of which is low can be quickly obtained under various circumstances.

Additionally, a dark-time image can be obtained with an interpolation process under a further detailed image capturing condition from a dark-time image that is captured under a preset dark-time image capturing condition, whereby noise can be suppressed more suitably. As a result, a clearer image can be obtained.

Furthermore, differences among dark output data are stored in the dark output memory, whereby a memory area for storing images can be reduced. Consequently, a cost-saving image capturing apparatus can be provided.

Still further, an exposure time is divided, and the noise reduction process is executed for each divided exposure time, whereby the progression of an image capturing process can be verified on a screen at the time of long image capturing. This eliminates inconvenience of being unable to verify a captured image until exposure is terminated at the time of long exposure. Consequently, an image capturing apparatus that increases its display speed can be provided.

What is claimed is:

1. An image capturing apparatus having a shutter for making an image capturing element enter into one of a light-shielded state and a light-unshielded state, the apparatus comprising:
    an image capturing condition storing unit which stores a plurality of image capturing conditions;
    a dark-time image data storing unit which stores a plurality of pieces of dark-time image data respectively captured under the plurality of image capturing conditions with the image capturing element in the light-shielded state;
    a bright-time image data storing unit which stores bright-time image data captured with the image capturing element in the light-unshielded state;
    a dark-time image data extracting unit which extracts from among the plurality of pieces of dark-time image data stored in the dark-time image data storing unit, dark-time image data captured under an image capturing condition corresponding to an image capturing condition under which the bright-time image is captured;
    a correcting unit which corrects the bright-time image data based on the dark-time image data extracted by the dark-time image data extracting unit; and
    a dark-time image data generating unit which executes an interpolation process using the dark-time image data stored in the dark-time image data storing unit, wherein based on the interpolation process, the dark-time image data generating unit generates: (i) a given image capturing condition, which is not included in the plurality of image capturing conditions stored in the image capturing condition storing unit, and (ii) dark-time image data which corresponds to the given image capturing condition.

2. The image capturing apparatus according to claim 1, wherein each image capturing condition includes a combination of an image capturing sensitivity and an exposure time.

3. The image capturing apparatus according to claim 2, wherein each image capturing condition further includes an ambient temperature at the time of image capturing.

4. The image capturing apparatus according to claim 1, wherein the plurality of pieces of dark-time image data stored in said dark-time image data storing unit are differential image data among the dark-time image data.

5. The image capturing apparatus according to claim 1, further comprising:
    an exposure time dividing unit which divides an exposure time for the image capturing element;
    an accumulating unit which accumulates image data that is captured with the image capturing element and corrected by said correcting unit for each divided exposure time; and
    a displaying unit which displays the accumulated image data each time the image data is accumulated by said accumulating unit.

6. A dark current component cancel processing method for removing a dark current component from image data captured with an image capturing element, the method comprising:
    prestoring a plurality of pieces of dark-time image data, which are captured with the image capturing element, respectively for a plurality of predetermined image capturing conditions;
    obtaining bright-time image data by capturing an observation target image with the image capturing element;
    selecting dark-time image data obtained under an image capturing condition, which corresponds to an image capturing condition when the bright-time image data is obtained, from among the plurality of pieces of prestored dark-time image data;
    correcting the bright-time image data based on the selected dark-time image data; and
    executing an interpolation process using the prestored dark-time image data, and based on the interpolation process, generating: (i) a given image capturing condition, which is not included in the plurality of predetermined image capturing conditions, and (ii) dark-time image data which corresponds to the given image capturing condition.

7. The dark current component cancel processing method according to claim 6, wherein:
    a plurality of sets of dark-time image data are prestored according to an ambient temperature;
    a first ambient temperature at a time point when the observation target image has been captured with the image capturing element is detected; and
    dark-time image data obtained at a second ambient temperature detected to be closest to the first ambient temperature is selected from among the stored dark-time image data.

* * * * *